Figure 1:
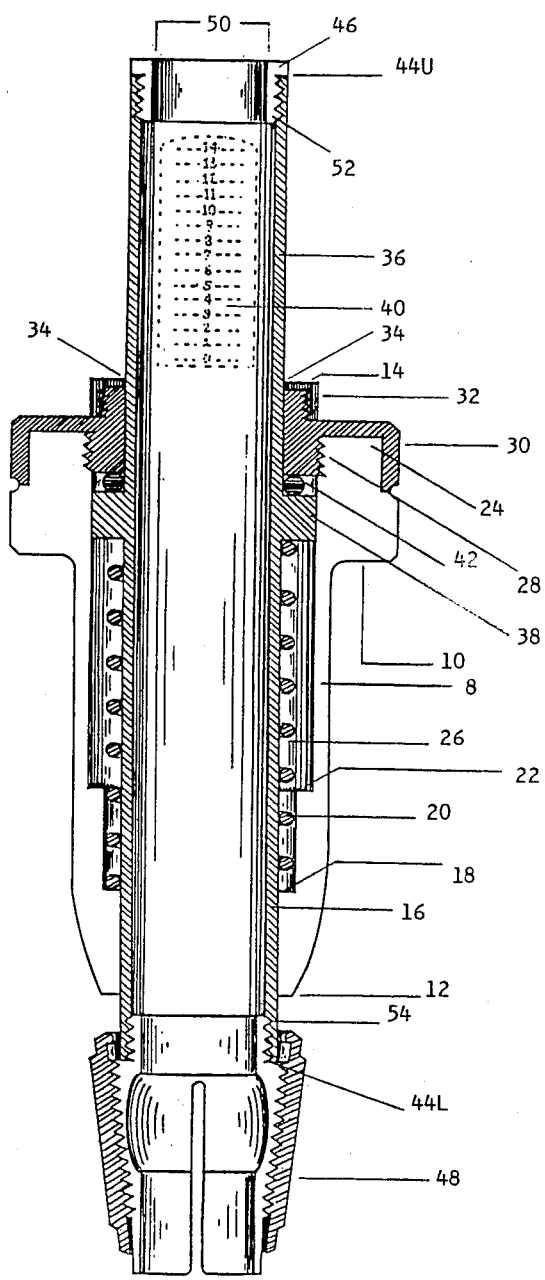

United States Patent [19]

Keinert, Jr.

[11] Patent Number: 4,785,897

[45] Date of Patent: Nov. 22, 1988

[54] PORTABLE SCALE

[76] Inventor: Albert O. Keinert, Jr., 409 Morningside Dr., Lakeland, Fla. 33803

[21] Appl. No.: 101,849

[22] Filed: Sep. 28, 1987

[51] Int. Cl.⁴ .................... G01G 3/02; G01G 19/56
[52] U.S. Cl. .................................. 177/232; 177/148; 177/245
[58] Field of Search ............... 177/148, 149, 232, 233, 177/245

[56] References Cited

U.S. PATENT DOCUMENTS

| | | | |
|---|---|---|---|
| 2,129,469 | 9/1938 | Hedges | 177/232 X |
| 2,633,351 | 3/1953 | Fowle | 177/233 X |
| 3,077,237 | 2/1963 | Nakayama | 177/245 |
| 3,223,189 | 12/1965 | Robbins | 177/149 |
| 3,276,527 | 10/1966 | Nelson | 177/149 |

Primary Examiner—George H. Miller, Jr.

[57] ABSTRACT

A weighing device for attaching to the handle of a fish landing net or gaff has a tubular inner housing telescopingly received within a tubular outer housing, with a spring received between an annular collar centrally located on the inner housing and an internal shoulder on the outer housing. An "O" ring located on the side of the collar opposite the shoulder acts as a shock absorber and abuts a retaining ring that limits the travel of the collar in a direction away from the shoulder. A second shoulder spaced from the first shoulder acts to limit movement of the collar toward the first shoulder. A friction retaining adaptor attached at an end of the inner housing secures the net or gaff handle to the inner housing, and scale markings on the other end of the inner housing, which can be zeroed to eliminate the weight of the net or gaff, serve to indicate the weight of the fish.

20 Claims, 2 Drawing Sheets

PORTABLE SCALE

BACKGROUND—FIELD OF INVENTION

This invention relates to improvements in the mechanics, securing means, design and safety of portable scales; and, in particular, relates especially to a fish-weighing device, which can be secured to the handle of a fish-landing net or gaff to determine the weight of a fish held captive thereby.

BACKGROUND—DESCRIPTION OF PRIOR ART

Prior art portable scales of the type to which the present invention relates have claimed numerous achievements, one of which was the ability to secure to net handles of various diameters as disclosed, for example, in U.S. Pat. No. 3,276,527. Although the '527 device attached to the handles, it was at best semi-secured at one end and totally unsecured at the other. Also, the indicating, biasing and securing means protruded or were so exposed as to be a destructive threat to the sides of a boat, not to mention the hazard presented the operator, especially if his or her hand was wet and it slipped from the scale while attempting to weigh a netted fish. In addition to this, accidental release of the biasing means could result in damage to the scale. Another example, shown in U.S. Pat. No. 3,223,189, claimed an end plug for zero adjustment of the scale. This actually was a means to take up the free length of the spring, could only exert positive tension, and could not be readjusted to zero after a positive load, such as a long-handled landing net, had been applied. Although not shown the U.S. Pat. No. 3,223,189 drawings, the windings of the coil spring were exposed in the slot for the weight indicator, which made reading the scale a little confusing and a little painful if the user's hand shifted slightly and got pinched in the spring. Also, securing this scale to a net handle required drilling a hole in the handle, a task most consumers are unwilling or unable to perform.

While the above-mentioned scales attach along the length of the net handle, there are scales that fasten to or are part of the non-net end of the handle. My first attempt at designing a scale was similar to the second method, but I soon learned that a two-foot diameter landing net had a "bag" or sagging meshed area of 1½ feet, making a length of 3½ feet. This added to a four-foot net handle required that the net handle be held above 7½ feet to position the fish to be weighed.

In addition to having a limited use, some prior art devices were too expensive to manufacture. Adding this to the above-mentioned reasons illustrates why there now is no commercially-successful landing net scale available for purchase in usual sources providing equipment to sport fishing interests.

OBJECTS AND ADVANTAGES

In developing embodiments of my portable scale invention, good design, mechanics, safety and simplicity for manufacturing were my requisites and some of the objects and advantages of my invention derived from this approach are the provision of a portable scale, such as a fish weighing device having the following features:

A streamlined outer housing design with a shoulder so the hand can grip it firmly and not slip off. Also, the outer housing's streamlined design will not present a hazard to the sides of a boat or to an operator, as the biasing means is completely covered and within said housing. In addition, when the landing net is in a sweeping motion and the scale contacts the side of a boat, the outer housing rotates and acts as a bearing, thereby not impeding the use of the landing net.

The inside of said housing has a spring stop so as not to overstress the biasing means.

This scale can receive, zero adjust, and secure to standard sized net handles of verious diameters and lengths without any wobble, front or rear. The tubular inner housing provides a smooth friction-reducing surface upon which the telescoping outer housing freely moves, thus making the operation of the scale much easier.

It has a shock-absorbing device to dampen the effect of an accidental release of the biasing means.

The adjustment to the free length of the spring and the zero adjustment to the scale are separate, and each has its own adjusting means. The zero adjustment to the scale is by indicative means, and presents no additional load to the biasing means.

The outer portion of the shoulder of the outer housing will always appear congruent to the adjacent outer portion of the outer housing retaining ring, and will not expose any of the threaded portion so as to pose a hazard.

No drilling is required to secure the scale to the net handle. It is secured by threaded friction means.

In addition to designing with an eye to aesthetics and safety, cost and ease of assembly have been a consideration. Unlike the painstaking assembly requirements of prior art devices, assembly of my scale is straightforward—you drop the parts into the housing and screw on a retaining ring and adapters, providing a completed scale ready for packaging. It is literally that simple.

Today's sportsmen are acutely aware of the increased pressure on fishing brought about by an ever-increasing population, and to preserve the productive areas left to them, most are practicing a catch and release system of fishing. This system requires that the fish be handled as little as possible and be released unharmed. Currently, authorities controlling restricted fishing areas establish the fish which may be retained by fisherman by the length of the fish. My scale makes possible the addition of another dimension for retention which could simplify the decision-making process. In fact, determination of which fish to be retained might be better determined by weight than length since weight would more accurately describe the overall health and condition of the fish.

Fishing tournaments abound in most states throughout the year, with both money and prizes of significance being offered to the winning fisherman. Prize winners are always determined by weight, either by the largest fish caught or by the largest total pounds of a limited number of fish caught. Penalties are exacted for dead fish. Fishermen must in some way decide which fish to keep to be presented at an official weigh-in. The availability of a landing net scale to easily determine the weight of each fish as it is brought aboard would eliminate extensive handling of fish and the necessity of keeping all fish caught during the day because of the difficulty of determining the exact weight of each fish. Weight is normally determined by simply hefting the fish in one's hand—a method which is not accurate or beneficial to the fish.

There are few people today who are not concerned with ecology, who make no effort to conserve our resources for tomorrow. Since currently-available fish weighing scales are designed to weigh dead fish or are so constructed that the act of weighing will probably kill the fish, the advantages of my scale are obvious. No longer will fishermen need to skewer a fish on a sharpened hook attached to a small hand-held scale in order to determine its weight. The fish can easily be weighed in the fish net with the scale attached to it and released unharmed.

The advantages of this invention will become more apparent on examination of the detailed description and accompanying drawings showing a preferred embodiment of portable scale in accordance with the principles of my invention. Like numerals refer to like parts throughout.

Figure 2:
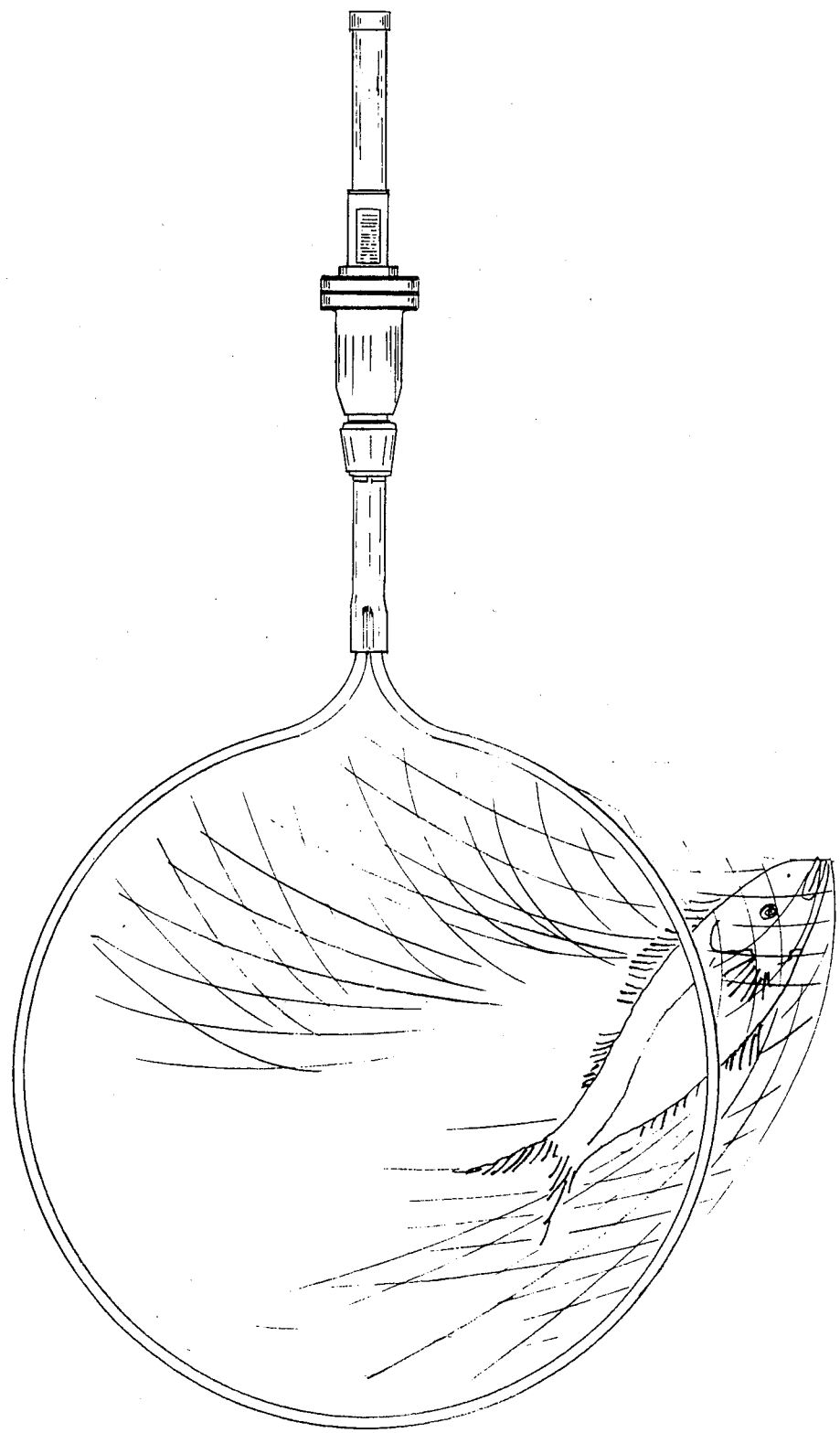

DRAWING FIGURES:

FIG. 1 is a longitudinal section of the scale.
FIG. 2 is a view of a fish landing net with this scale attached

DRAWING REFERENCE NUMERALS:

8—outer housing
10—support shoulder
12—lower distal end of 8
14—top side of 32
16—inner housing
18—lower spring support shoulder
20—coil spring
22—spring stop shoulder
24—upper distal end of 8
26—inner portion of 8
28—outer housing retaining threads
30—outer housing retaining ring
32—end cap
34—centered hole in 32
36—indicative sleeve of 16
38—inner housing collar
40—scale index
42—'O' ring damper
44L—lower distal end of 16
44U—upper distal end of 16
46—end cap adapter
48—friction retaining adapter
50—centered hole of 46
52—threaded means of 36
54—threaded means lower portion 16

DESCRIPTION/OPERATION:

Referring to the drawings in detail, the scale includes an elongated, rotatable, bell-shaped tubular outer housing 8 having a central bore. A flared portion on the outer periphery of housing 8 forms a hand-grippable support shoulder 10. The bore has an opening at a lower distal end 12 of the housing 8 that is just slightly larger than the outside diameter of a tubular inner housing 16 also having a central bore and being coaxially received within the bore of the outer housing 8. Axially spaced and slightly above the end 12 opening the diameter of the outer housing bore is enlarged forming the lower spring support shoulder 18 which supports the lower portion of a coil spring 20 positioned annularly surrounding inner housing 16 in an enlarged inner portion 26 of the outer housing bore. Slightly above this area of support shoulder 18 the diameter of the outer housing bore is again enlarged, presenting an axially spaced annular support shelf which forms a spring stop shoulder 22. Continuing toward the upper distal end 24 the inner portion 26 of the outer housing 8 terminates with threaded area 28 which secures to the outer housing retaining ring 30. Attached to an outer housing retaining ring 30 is a threaded annular end cap 32 with a centered circular hole 34 which is slightly larger in diameter than the outer diameter of the inner housing indicative sleeve member 36. The inner housing 16 is an elongated hollow tubular structure having an inside diameter slightly larger than the outside diameter of the largest standard net handle. Said inner housing 16 has an annular collar 38 on its outer periphery which is biased by spring 20 away from support 18 and stop 22. The upper portion of the inner housing consists of indicative sleeve member 36 which has an index 40 comprising a plurality of weight indicating indicia marked at axially spaced locations on the outside of the inner housing 16 adjacent the end cap 32 of the outer housing 8. Said indicative sleeve member 36 coaxially receives an 'O' ring damper 42 where it meets collar 38. The upper distal end 44U and lower distal end 44L of inner housing 16 are threaded to receive either an end cap adapter 46 or friction retaining adapter 48 or a combination thereof. Said end cap adapter 46 has a centered hole 50 which is slightly larger in diameter than the outside diameter of the net handle it receives and is secured to inner housing indicative sleeve member 36 by threaded means 52. Said friction retaining adapter 48 also has an interior diameter slightly larger than the outside diameter of the net handle it receives, and is secured to the lower distal end 12 of inner housing 16 by threaded means 54. The collar is confined within the portion 26 of the outer housing bore, with the downward extent of telescopic movement of housing 16 within housing 8 being limited in one direction by contact of collar 38 with the stop shoulder 22 and in the other direction by contact of the collar 38 with the "O" ring 42 and retaining ring 30.

The scale is designed so that when attached, the weight of the heaviest standard size landing net will have an indicated weight on the negative side of zero. To adjust for the weight of the landing net, end cap 32 is unscrewed (turned counter-clockwise) until top side 14 of end cap 32 is aligned with the zero indication on the inner housing indicative sleeve 36. To use and attach the scale to a handle of a fish landing net, the handle is inserted through the friction retaining adapter 48, inner housing 16, and end cap adapter 46. After positioning the scale where it is comfortable to hold and read, the friction retaining adapter 48 is tightened, thus securing the scale to the handle.

With the scale securely attached, the operator grips the outer housing 8 firmly, allowing his thumb and index finger to support the underside of support shoulder 10 and, turning the net handle vertically, with the net end down, the scale is read by alignment of top side 14 of end cap 32 with the indicia of the inner housing indicative sleeve 36.

Thus, from the above description the reader will see that the scale of the invention provides a streamlined, highly reliable, yet economical device which can be attached and safely used by persons of almost any age.

While my description contains many specifications, these should not be construed as limitations, on the scope of the invention, but rather as an exemplification of one preferred embodiment thereof. Many other variations are possible, for example:

Skilled artisans will readily be able to change the shape and proportion of the various possible embodiments. They will also be able to make the scale of different types of materials. They can make variations on the location of the indicative sleeve 36 and end cap 32. Also, they can make the scale with dual or multiple smaller biasing means. The scale can be made with a moveable index instead of a fixed one, or a fixed outer housing instead of a rotatable one. The scale can also be secured by various means. Accordingly, the reader is requested to determine the scope of the invention by the appended claims and their legal equivalents, and not by the example which have been given.

I claim:

1. A portable scale for mounting on and cooperating with an object to be weighed, comprising:
   a tubular outer housing having a central bore with a shoulder annularly positioned therein;
   a tubular inner housing having a central bore, said inner housing being coaxially received and confined within said bore of said outer housing for telescoping axial movement with respect thereto and having an annular collar on its outer periphery;
   means located between said collar and said shoulder for biasing said collar away from said shoulder;
   means for limiting the extent of axial movement of said collar in a direction away from said shoulder;
   means for releasably connecting said inner housing to an object received within said bore of said inner housing; and
   means for indicating the extent of axial movement of said inner housing relative to said outer housing;
   whereby when said inner housing is secured to the object and said outer housing is restrained, the weight of the object can be determined from the axial movement shown on said indicating means.

2. A portable scale as in claim 1, wherein said indicating means comprises weight indicating indicia marked at axially spaced locations on the outside of said inner housing adjacent one end of said outer housing.

3. A portable scale as in claim 2, wherein said indicating means further comprises a threaded end cap mounted on said one end of said outer housing annularly of said weight indicating indicia, and axially adjustable relative to said outer housing.

4. A portable scale as in claim 3, wherein said means for limiting the extent of axial movement away from said shoulder comprises an annular retaining ring received at the end of said outer housing on the side of said collar away from said shoulder, and wherein said end cap is threadedly affixed to said outer housing annular retaining ring.

5. A portable scale as in claim 1, wherein said means for limiting the extent of axial movement away from said shoulder comprises an annular retaining ring received at the end of said outer housing on the side of said collar away from said shoulder.

6. A portable scale as in claim 5, wherein said annular retaining ring comprises means for adjusting the free length of the biasing means.

7. A portable scale as in claim 1, wherein said biasing means is completely contained within a cavity between said inner and outer housings, thereby protecting the operator from any contact with said biasing means.

8. A portable scale as in claim 1, wherein said biasing means consists of a coil spring.

9. A portable scale as in claim 1, wherein said outer housing is freely movable rotationally with respect to said inner housing.

10. A portable scale as in claim 1, wherein said outer housing has an elongated bell shape having an outer peripheral flared portion that acts as a hand-grippable supporting shoulder.

11. A portable scale for mounting on and cooperating with an object to be weighed, comprising:
    a tubular outer housing having a central bore with first and second axially-spaced shoulders annularly positioned therein at one end thereof and a retaining ring annularly positioned at the other end thereof;
    a tubular inner housing having a central bore, said inner housing being coaxially received within said bore of said outer housing for telescoping axial movement with respect thereto and having an annular collar on its outer periphery confined between said second shoulder and said retaining ring for limiting said movement;
    means located between said collar and said first shoulder for biasing said collar toward said retaining ring;
    means for releasably connecting said inner housing to an object received within said bore of said inner housing; and
    means for indicating the extent of axial movement of said inner housing relative to said outer housing;
    whereby when said inner housing is secured to the object and said outer housing is restrained, the weight of the object can be determined from the axial movement shown on said indicating means.

12. A portable scale as in claim 11, wherein said indicating means comprises weight indicating indicia marked at axially spaced locations on the outside of said inner housing adjacent one end of said outer housing.

13. A portable scale as in claim 12, wherein said indicating means further comprises a threaded end cap mounted on one end of said outer housing annularly of said weight indicating indicia, and axially adjustable relative to said outer housing.

14. A portable scale as in claim 12, wherein a doughnut shaped shock absorber is coaxially received between said collar and said retaining ring.

15. A portable scale as in claim 14, wherein said shock absorber comprises an "O" ring.

16. A portable scale as in claim 11, wherein one end of said inner housing is threaded.

17. A portable scale as in claim 16, further comprising means securing an object handle to said threaded end.

18. A portable scale as in claim 17, wherein said second end is threaded and further comprising adaptor means for enabling various diameter handles to be accommodated by said inner housing.

19. A portable scale as in claim 17, wherein said securing means consists of a threaded friction device.

20. A portable scale as in claim 11, wherein said outer housing has an elongated bell shape having an outer peripheral flared portion that acts as a hand-grippable supporting shoulder for preventing the housing from slipping from a user's hand.

* * * * *